(12) United States Patent
Romain et al.

(10) Patent No.: US 11,023,634 B1
(45) Date of Patent: Jun. 1, 2021

(54) DOWNSTREAM SLACK CREATION IN INTEGRATED CIRCUIT DEVELOPMENT

(71) Applicant: International Business Machines Corporation, Armonk, NY (US)

(72) Inventors: Michael Romain, Beacon, NY (US); Eddy St. Juste, Monroe, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/741,964

(22) Filed: Jan. 14, 2020

(51) Int. Cl.
*G06F 30/33* (2020.01)
*G06F 119/12* (2020.01)

(52) U.S. Cl.
CPC .......... *G06F 30/33* (2020.01); *G06F 2119/12* (2020.01)

(58) Field of Classification Search
USPC ........................................................ 716/108
See application file for complete search history.

(56) References Cited

U.S. PATENT DOCUMENTS

| | | | |
|---|---|---|---|
| 7,913,103 | B2 | 3/2011 | Gold et al. |
| 8,336,012 | B2 | 12/2012 | Fry et al. |
| 8,473,884 | B2 | 6/2013 | Daede et al. |
| 8,578,321 | B2 | 11/2013 | Iyer et al. |
| 8,589,845 | B2 | 11/2013 | Albrecht et al. |
| 8,806,410 | B2 | 8/2014 | Kumar et al. |
| 9,064,069 | B1 | 6/2015 | Lind et al. |
| 9,329,622 | B2 | 5/2016 | Fatemi et al. |
| 9,570,146 | B1 | 2/2017 | Haywood |
| 9,734,268 | B2 | 8/2017 | Berry et al. |
| 9,754,062 | B2 | 9/2017 | Kalafala et al. |
| 9,842,187 | B1 | 12/2017 | Zejda et al. |
| 9,864,824 | B2 | 1/2018 | Hathaway et al. |
| 10,048,316 | B1 | 8/2018 | Coutts et al. |
| 2008/0028415 | A1 | 1/2008 | Binns et al. |
| 2008/0216036 | A1 | 9/2008 | Foreman et al. |
| 2010/0313177 | A1 | 12/2010 | Zhang et al. |
| 2017/0046464 | A1 | 2/2017 | Berry et al. |
| 2017/0147739 | A1 | 5/2017 | Elmendorf et al. |
| 2017/0206294 | A1 | 7/2017 | Allen et al. |
| 2018/0239843 | A1* | 8/2018 | Hieter ................... G06F 30/398 |

(Continued)

OTHER PUBLICATIONS

Herupalli et al., "Exploiting Dynamic Timing Slack for Energy Efficiency in Ultra-Low-Power Embedded Systems", ISCA'16 43th ACM Inter. Symp., Jun. 2016, pp. 1-11.

(Continued)

*Primary Examiner* — Bryce M Aisaka
(74) *Attorney, Agent, or Firm* — Cantor Colburn LLP; William Kinnaman

(57) ABSTRACT

Aspects of the invention include a method that includes performing timing analysis of an integrated circuit design to identify a critical path. The critical path fails to meet a corresponding timing requirement. The method also includes determining an amount of slack needed by the critical path. The amount of slack is an amount by which the critical path fails to meet the corresponding timing requirement. Downstream slack is created in each path of a next cycle, wherein each path of the next cycle is immediately downstream of the critical path. Slack stealing is performed to improve timing of the critical path based on the downstream slack created in each path of the next cycle.

20 Claims, 4 Drawing Sheets

(56) References Cited

U.S. PATENT DOCUMENTS

| | | |
|---|---|---|
| 2018/0239845 A1 | 8/2018 | Hieter et al. |
| 2018/0247007 A1 | 8/2018 | Chen et al. |
| 2019/0220561 A1 | 7/2019 | Hieter et al. |
| 2019/0220565 A1 | 7/2019 | Etscheid et al. |

OTHER PUBLICATIONS

Fields et al., "Slack: Maximizing Performance Under Technological Constraints", ISCA IEEE 29th Annual International Symposium, May 2002, pp. 1-12.

IBM "Method of Back-Annotating Timing Slack Information From Higher Level Timing Into Lower Level Timing for Timing Optimization", IPCOM000182378D, Apr. 28, 2009, pp. 1-3.

IBM "Timing Analysis Using Slack Stealing", IPCOM000120121D, Mar. 1, 1991, pp. 1-3.

IBM "Timing Based Net Typing for Optimized System Timing", IPCOM000109621D, Sep. 1, 1992, pp. 1-5.

Jeong et al., "Toward Effective Utilization of Timing Exceptions in Design Optimization", 11th International Symposium on Quality Electronic Design, 2010, pp. 54-61.

Kahng et al., "Slack Redistribution for Graceful Degradation Under Voltage Overscaling", IEEE, 2010, pp. 825-831.

Osogami et al., "Analysis of Cycle Stealing with Switching Times and Thresholds", Elsevier Science, Aug. 12, 2004, pp. 1-27.

Qi, He "Delay Test", Unviversity of Virginia, ECE 7502 Class Discussion, Mar. 19, 2015, pp. 1-20.

Teng et al., "Latch-Based Performance Optimization for FPGAs", FPL IEEE Computer Society, Sep. 2011, pp. 58-63.

Tiwari et al., "ReCycle: Pipeline Adaptation to Tolerate Process Variation", ISCA'07 34th ACM Annual International Symposium, Jun. 2007, pp. 323-334.

* cited by examiner

DOWNSTREAM SLACK CREATION IN INTEGRATED CIRCUIT DEVELOPMENT

BACKGROUND

The present invention generally relates to integrated circuit development, and more specifically, to downstream slack creation in integrated circuit development.

Integrated circuit (i.e., chip) development refers to the processes involved in the design and fabrication of the chip. The processes associated with designing the chip include obtaining a register transfer level (RTL) description and performing physical design to identify and place components such as gate logic. The physical design processes generally begin with logic synthesis, which maps the RTL description to a gate-level netlist (i.e., list of logical interconnects), and end with tapeout and mask generation, which refers to turning the design data into photomasks that are used in the manufacturing process. Through different stages of development, timing analysis, as well as power, noise, and congestion analysis can be performed to ensure that the fabricated integrated circuit meets all the requirements.

SUMMARY

Embodiments of the present invention are directed to downstream slack creation in integrated circuit development. A non-limiting example computer-implemented method includes performing timing analysis of an integrated circuit design to identify a critical path. The critical path fails to meet a corresponding timing requirement. The method also includes determining an amount of slack needed by the critical path. The amount of slack is an amount by which the critical path fails to meet the corresponding timing requirement. Downstream slack is created in each path of a next cycle. Each path of the next cycle is immediately downstream of the critical path. Slack stealing is performed to improve timing of the critical path based on the downstream slack created in each path of the next cycle.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
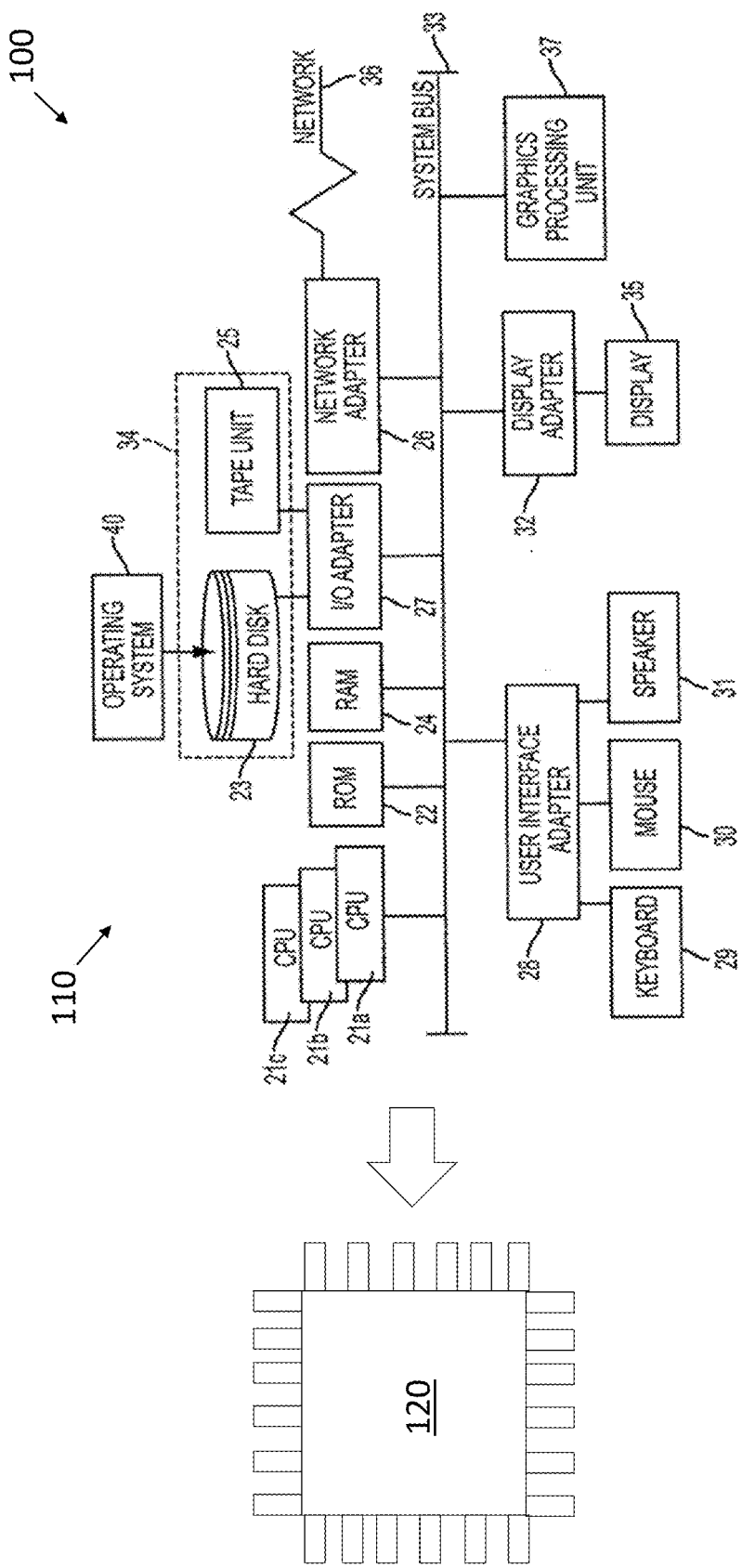
FIG. 1 is a block diagram of a system to perform downstream slack creation in integrated circuit development according to embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, timing, noise, power, congestion, and other characteristics of an integrated circuit design can be analyzed at different stages of development to ensure that the fabricated integrated circuit meets all requirements. Timing refers to the time for a signal introduced at an input pin to reach an output pin of the chip. This timing is a sum of the timing associated with each path that is traversed from the input pin to the output pin. A path, which is implemented by a wire in the integrated circuit, connects an originating component to the destination component, and the timing associated with the path includes the time required for the originating component to process the signal as well as for the signal to travel between the two components (i.e., over the path). The signal associated with each path from one component to the next component can be assigned a required arrival time (RAT), and a path with a signal arrival time that exceeds its RAT can be deemed a failing or critical path whose timing must be improved. A path with timing that is below the RAT (i.e., is faster than required) has positive timing slack or additional time according to the amount by which the timing is faster than the RAT. When timing analysis indicates that some paths are critical paths (i.e., have timing that exceeds their RAT) while other paths have positive timing slack, slack stealing—also referred to as real adjust or cycle stealing—is a technique by which the timing of critical paths is improved. Specifically, the clock cycle boundary is adjusted, as needed, to more evenly distribute positive slack to the critical paths.

Embodiments of the invention relate to downstream slack creation. According to the one or embodiments detailed herein, rather than relying on timing slack that may be present in other parts of the integrated circuit design in order to perform slack stealing, timing slack is created in one or more paths that are downstream of a critical path. Creating the timing slack in downstream paths facilitates efficient slack stealing to address the critical path. The specific technique that is used to create slack in a downstream path can depend on the integrated circuit development stage at which timing analysis is being performed. The creation and rebalancing of timing slack that results from implementation of the embodiments of the invention prevents unnecessary overdesign of the integrated circuit. This, in turn, has beneficial effects on congestion and power management for the integrated circuit design, as well.

FIG. 1 is a block diagram of a system 100 to perform downstream slack creation in integrated circuit development according to embodiments of the invention. The system 100 includes a processing system 110 used to generate the design that is ultimately fabricated into an integrated circuit 120. The steps involved in the fabrication of the integrated circuit 120 are well-known and briefly described herein. Once the physical layout is finalized, based, in part, on downstream slack creation according to embodiments of the invention to facilitate slack stealing to address critical timing, power, or congestion issues, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 4.

The processing system 110 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 110 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 110.

Figure 2:
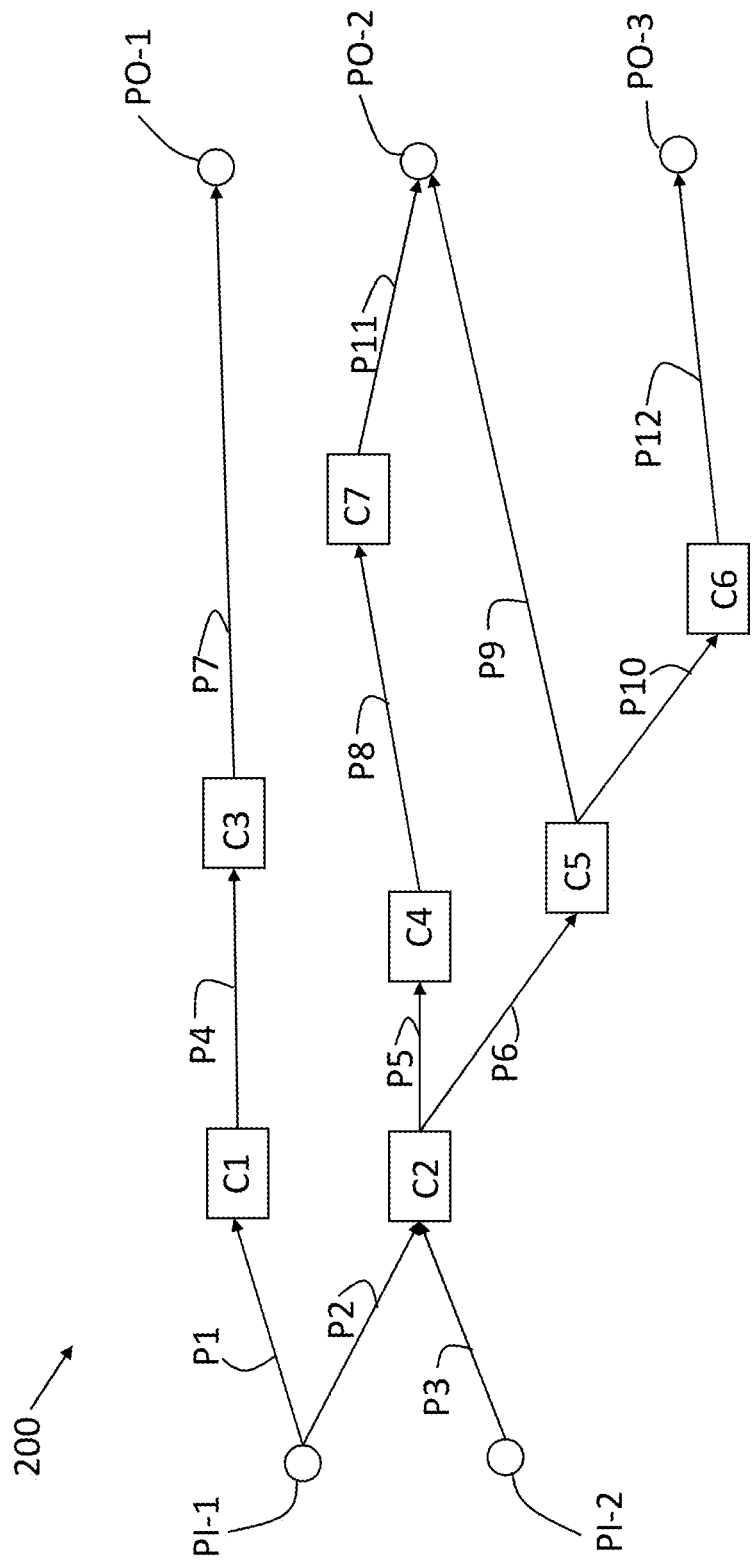
FIG. 2 illustrates a simplified integrated circuit design that benefits from downstream slack creation according to one or more embodiments of the invention.

FIG. 2 illustrates a simplified integrated circuit design 200 that benefits from downstream slack creation according to one or more embodiments of the invention. Two input ports PI-1 and PI-2 facilitate the input of signals that ultimately propagate to one of three output ports PO-1, PO-2, and PO-3 via different paths P1 through P12 that interconnect components C1 through C7. Typically, components C1 through C7 are flip flops, sometimes called latches. They are circuit elements that accept a clock signal and serve as timing nodes. Logic gates and buffers do not accept clocks and, thus, do not serve as boundaries for paths where cycle stealing is possible. Paths P1 through P12 are composed of logic gates and buffers. While each path P1 through P12 is discussed individually for explanatory purposes, a path can be a set of paths going from PI to PO. Such a path is multi cycle and includes latches. Timing analysis involves examination of the downstream propagation of signals from the input ports PI-1 and PI-2 over the paths P1 through P12 to one of the output ports PO-1, PO-2, and PO-3. As previously noted, the arrival time of a signal at the input of a given component (e.g., the arrival time of a signal from the input port PI-2 over the path P2 to the input of component C2) is compared with its RAT to determine whether there is any slack.

If the arrival time exceeds (i.e., is later than) the RAT, then it is determined that the path (e.g., path P2) has a negative slack and the path is regarded as a critical path in terms of timing improvement. As used herein, slack generally refers to positive slack associated with a path. Positive slack results if the arrival time is less than (i.e., is earlier than) the RAT and has a value equal to the difference between the arrival time and RAT. For the overall integrated circuit design 200, some paths may have positive slack while others have negative slack. Sometimes design changes can be made within a critical path to address the negative slack. When this is not possible, slack stealing can be employed. According to prior techniques, slack stealing is performed to take advantage of any positive slack associated with other paths that happens to be available.

According to one or more embodiments of the invention, the slack stealing is facilitated and made easier by adding a step of creating slack where it is easiest to steal. That is, rather than trying to harvest positive slack that happens to be available elsewhere in the integrated circuit design 200 but may be inconvenient or inefficacious to steal, positive slack is first created downstream of the critical path. This facilitates the movement of the clock cycle boundary, as needed, to address the negative slack in the critical path. For example, if the path (e.g., path P2) is determined to be a critical path (e.g., x picoseconds (ps) of negative slack) according to timing analysis, the paths P5 and P6 that are in the next (downstream) cycle are redesigned to try to create a slack of x ps. If either of the paths P5 or P6 does not yield x ps of positive slack but a smaller y ps of positive slack, the difference in slack (i.e., (x-y) ps) is sought in the next cycle (i.e., path P8 in the case of path P5, and paths P9 and P10 in the case of path P6). This process is carried downstream to the output ports PO-1, PO-2, and PO-3, as needed. At that stage, any remaining positive slack that is needed can be obtained by adjusting the timing constraints at the output ports PO-1, PO-2, and PO-3. This process is illustrated more generally in FIG. 3.

Figure 3:
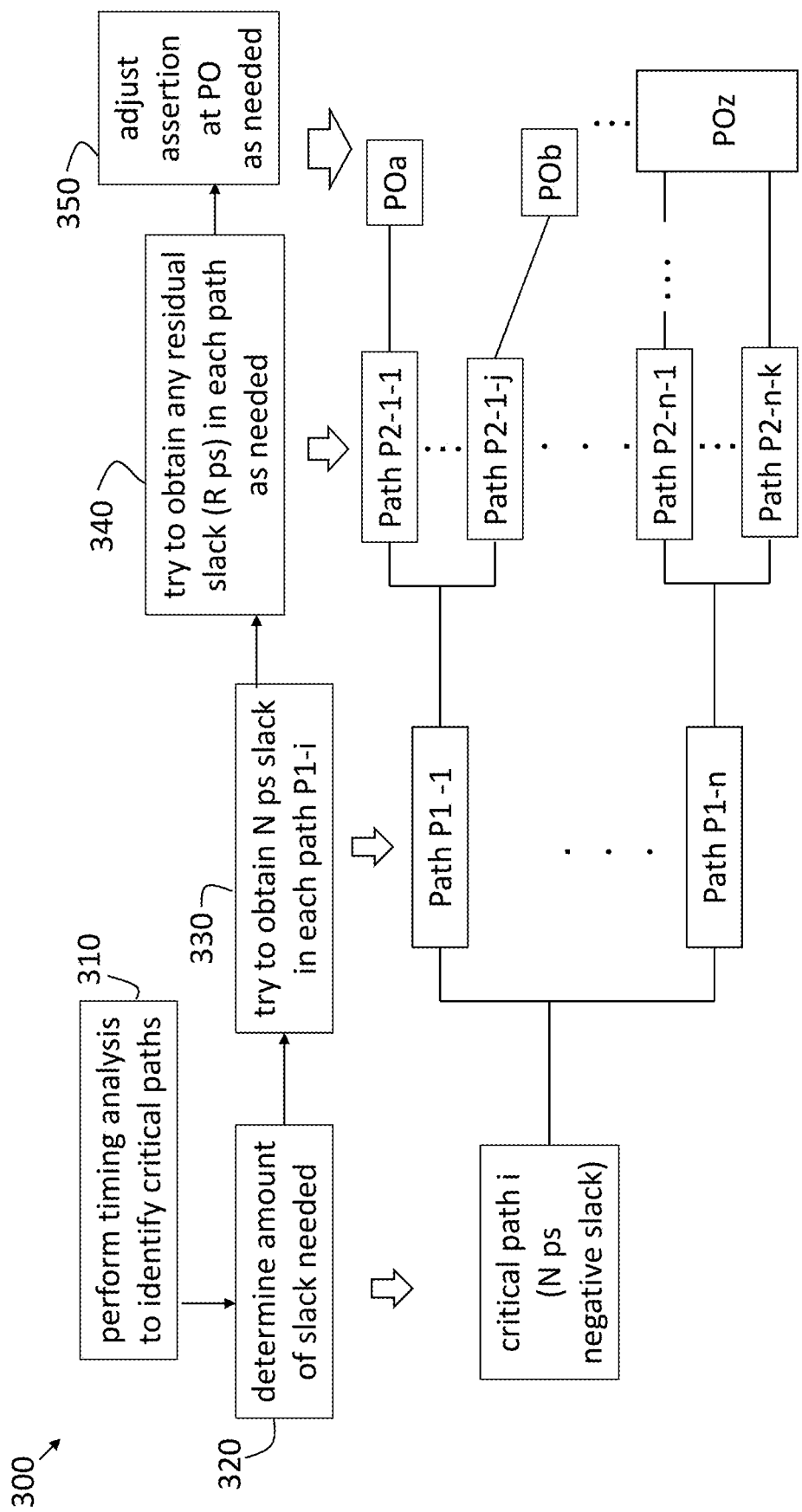
FIG. 3 is a flow diagram of a method of performing downstream slack creating according to one or more embodiments of the invention.

FIG. 3 is a flow diagram of a method 300 of performing downstream slack creating according to one or more embodiments of the invention. All or a portion of the processing shown in FIG. 3 can be performed, for example, by the processing system 110 of FIG. 1. FIG. 3 is discussed with continuing reference to FIG. 2. At block 310, performing timing analysis to identify critical paths can result in the identification of one or more paths as critical (i.e., path fails timing test because arrival time exceeds RAT). When more than one path is identified as critical, the processes discussed with reference to blocks 320 through 350 are performed for each of the two or more critical paths. Here, the processes are discussed for a given critical path (e.g., path P6 shown in FIG. 2). At block 320, determining the amount of slack needed refers to computing the amount of negative path slack (N ps) for the given critical path (i.e., arrival time—RAT).

At block 330, the processes include trying to obtain N ps of positive slack from each path in the next cycle. In FIG. 3, the next cycle includes paths P1-1 through P1-n. Thus, at block 330, design changes are made, as needed, to try to create N ps of positive slack in each of the paths P1-1 through P1-n. For the exemplary given critical path being path P6 shown in FIG. 2, the next cycle includes paths P9 and P10. Thus, at block 330, if one or both paths P9 and P10 do not already exhibit N ps of positive slack, design changes are implemented to try to create N ps of positive slack in both paths P9 and P10. As previously noted, the design changes that are implemented to create positive slack can be different depending on the development stage of the integrated circuit at which the timing analysis is being performed (at block 310).

For example, in earlier stages (e.g., after a netlist has been created but prior to routing, the synthesis algorithms can focus on certain paths to create the positive slack in the next cycle paths. As another example, after synthesis but prior to routing, the gates whose processing times are part of the arrival time for the next cycle paths can be downsized or power-tuned to reduce the voltage threshold (VT). This, in turn, results in faster processing time and faster arrival time (i.e., increased positive slack). After an initial routing attempt, the positive slack of next cycle paths can be affected using wire tuning (e.g., thicker and, thus, faster wires) and buffers. The processes at block 330 can be done iteratively to incrementally improve positive slack.

The design changes made as part of the processes at block 330 may not succeed in obtaining N ps of positive slack in each of the next cycle paths. For example, one of the next cycle paths (e.g., path P1-1 in FIG. 3 or path P9 in FIG. 2) may exhibit less than N ps of positive slack even after the design changes at block 330. The residual slack R ps that is needed is computed as part of the process at block 330 (R=N—obtained slack). For example, if N is 5 ps and the obtained slack is 3 ps, then the residual slack R is 2 ps. The way that this residual slack is handled depends on the next cycle path that failed to achieve the N ps of positive slack.

According to one example, in the case of path P1-1, the processes at block 340 are performed. At block 340, for any of the paths P2-1-1 through P2-1-j that do not already exhibit R ps of positive slack, design changes are implemented to try to obtain R ps of positive slack. Thus, the difference between the processes at block 330 and the processes at block 340 are only in the cycle in which the processes are performed. If R ps of positive slack is not achieved in every path P2-1-1 through P2-1-j, then further residual slack (RR) (RR=R—obtained slack) is computed as part of block 340 and the processes at block 350 are performed.

According to another example of how residual slack R can be handled, in the case of path P9, the processes at block 350 are performed, because there is no next cycle path to path P9. Instead, path P9 terminates at output port PO-2. At block 350, for any residual slack R (in the case of path P9) or further residual slack RR (in the case of one of the paths P2-1-1 through P2-1-j, for example), the assertion or timing constraint at the corresponding output port (e.g., output port PO-2 in the case of path P9) is adjusted. Specifically, the RAT for the signal reaching the output port is increased. Adjusting the timing constraint like this is possible when the next level of hierarchy indicates positive slack that may be taken advantage of.

While a limited set of cycles are shown for explanatory purposes, it should be clear that the processes at block 340 can be repeated for as many subsequent cycles as are present in a given design and as are needed based on the positive slack remaining to be achieved after each cycle.

Figure 4:
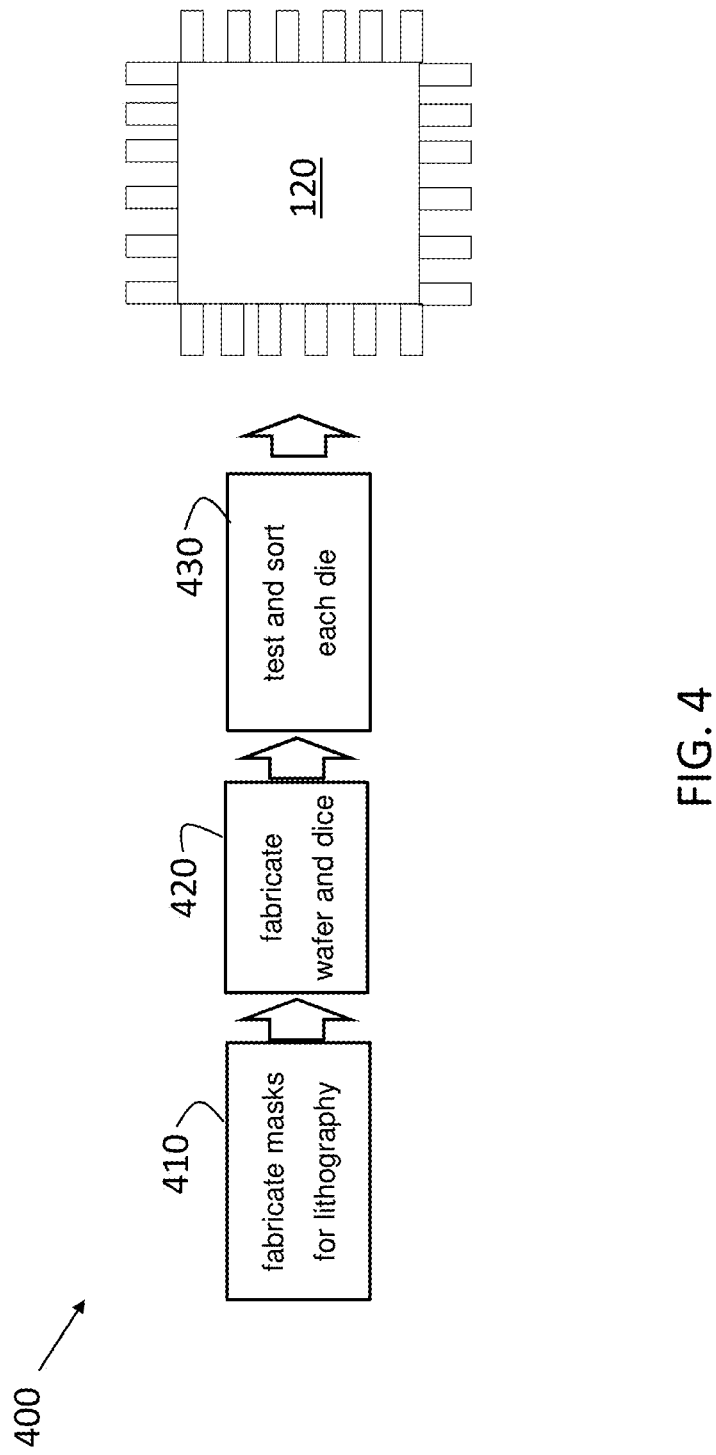
FIG. 4 is a process flow of a method of fabricating the integrated circuit according to exemplary embodiments of the invention.

FIG. 4 is a process flow of a method 400 of fabricating the integrated circuit 120 according to exemplary embodiments of the invention. Once the physical design data is obtained, based, in part, on the downstream slack creation according to one or more embodiments of the invention, the integrated circuit 120 can be fabricated according to known processes that are generally described with reference to FIG. 4. Generally, a wafer with multiple copies of the final design is fabricated and cut (i.e., diced) such that each die is one copy of the integrated circuit 120. At block 410, the processes include fabricating masks for lithography based on the finalized physical layout. At block 420, fabricating the wafer includes using the masks to perform photolithography and etching. Once the wafer is diced, testing and sorting each die is performed, at block 430, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    performing timing analysis of an integrated circuit design to identify a critical path, wherein each path of the integrated circuit, including the critical path, is implemented by a wire during fabrication of the integrated circuit and the critical path fails to meet a corresponding timing requirement;
    determining an amount of slack needed by the critical path, wherein the amount of slack is an amount by which the critical path fails to meet the corresponding timing requirement;
    creating downstream slack in each path of a next cycle, wherein each path of the next cycle is immediately downstream of the critical path; and
    performing slack stealing to improve timing of the critical path based on the downstream slack created in each path of the next cycle.

2. The computer-implemented method according to claim 1, further comprising providing a final design for integrated circuit fabrication, wherein the final design is obtained by performing the slack stealing.

3. The computer-implemented method according to claim 1, further comprising identifying a deficient path of the next cycle as one in which the downstream slack is less than the amount of slack needed by the critical path.

4. The computer-implemented method according to claim 3, further comprising creating a difference slack in every path of a next cycle that is immediately downstream of the deficient path, wherein the difference slack is an amount by which the downstream slack is less than the amount of slack needed by the critical path.

5. The computer-implemented method according to claim 1, wherein the creating the downstream slack includes reducing a voltage threshold by downsizing gates.

6. The computer-implemented method according to claim 1, wherein the creating the downstream slack includes implementing synthesis algorithms designed to create positive slack.

7. The computer-implemented method according to claim 1, wherein the creating the downstream slack includes performing wire tuning or adding buffers.

8. The computer-implemented method according to claim 1, wherein the creating the downstream slack includes using a first technique during a first stage of integrated circuit development and using a second technique during a second stage of the integrated circuit development.

9. A system comprising:
a memory having computer readable instructions; and
one or more processors for executing the computer readable instructions, the computer readable instructions controlling the one or more processors to perform operations comprising:
  performing timing analysis of an integrated circuit design to identify a critical path, wherein each path of the integrated circuit, including the critical path, is implemented by a wire during fabrication of the integrated circuit and the critical path fails to meet a corresponding timing requirement;
  determining an amount of slack needed by the critical path, wherein the amount of slack is an amount by which the critical path fails to meet the corresponding timing requirement;
  creating downstream slack in each path of a next cycle, wherein each path of the next cycle is immediately downstream of the critical path; and
  performing slack stealing to improve timing of the critical path based on the downstream slack created in each path of the next cycle.

10. The system according to claim 9, further comprising providing a final design that is obtained by performing the slack stealing for integrated circuit fabrication.

11. The system according to claim 9, further comprising identifying a deficient path of the next cycle as one in which the downstream slack is less than the amount of slack needed by the critical path.

12. The system according to claim 11, further comprising creating a difference slack in every path of a next cycle that is immediately downstream of the deficient path, wherein the difference slack is an amount by which the downstream slack is less than the amount of slack needed by the critical path.

13. The system according to claim 9, wherein the creating the downstream slack includes reducing a voltage threshold by downsizing gates, implementing synthesis algorithms designed to create positive slack, or performing wire tuning or adding buffers.

14. The system according to claim 9, wherein the creating the downstream slack includes using a first technique during a first stage of integrated circuit development and using a second technique during a second stage of the integrated circuit development.

15. A computer program product comprising a computer readable storage medium having program instructions embodied therewith, the program instructions executable by a processor to cause the processor to perform operations comprising:
  performing timing analysis of an integrated circuit design to identify a critical path, wherein each path of the integrated circuit, including the critical path, is implemented by a wire during fabrication of the integrated circuit and the critical path fails to meet a corresponding timing requirement;
  determining an amount of slack needed by the critical path, wherein the amount of slack is an amount by which the critical path fails to meet the corresponding timing requirement;
  creating downstream slack in each path of a next cycle, wherein each path of the next cycle is immediately downstream of the critical path; and
  performing slack stealing to improve timing of the critical path based on the downstream slack created in each path of the next cycle.

16. The computer program product according to claim 15, further comprising providing a final design that is obtained by performing the slack stealing for integrated circuit fabrication.

17. The computer program product according to claim 15, further comprising identifying a deficient path of the next cycle as one in which the downstream slack is less than the amount of slack needed by the critical path.

18. The computer program product according to claim 17, further comprising creating a difference slack in every path of a next cycle that is immediately downstream of the deficient path, wherein the difference slack is an amount by which the downstream slack is less than the amount of slack needed by the critical path.

19. The computer program product according to claim 15, wherein the creating the downstream slack includes reducing a voltage threshold by downsizing gates, implementing synthesis algorithms designed to create positive slack, or performing wire tuning or adding buffers.

20. The computer program product according to claim 15, wherein the creating the downstream slack includes using a first technique during a first stage of integrated circuit development and using a second technique during a second stage of the integrated circuit development.

* * * * *